United States Patent [19]

Reid

[11] Patent Number: 4,987,406

[45] Date of Patent: Jan. 22, 1991

[54] SECURITY SYSTEM FOR ELECTRICAL APPLIANCES AND OTHER ITEMS WITH ELECTRICAL CIRCUITRY

[76] Inventor: Philip L. Reid, 400 S. Danzler Rd., Duncan, S.C. 29334

[21] Appl. No.: 437,776

[22] Filed: Nov. 17, 1989

Related U.S. Application Data

[63] Continuation of Ser. No. 240,547, Sep. 6, 1988, abandoned, which is a continuation-in-part of Ser. No. 37,701, Apr. 13, 1987, Pat. No. 4,791,409.

[51] Int. Cl.⁵ .............................................. G08B 21/00
[52] U.S. Cl. .................................... 340/539; 180/287; 307/10.2; 340/426; 340/825.76
[58] Field of Search .................. 340/539, 426, 825.76, 340/825.72; 180/287; 307/10.2

[56] References Cited

U.S. PATENT DOCUMENTS

| | | | |
|---|---|---|---|
| 3,907,060 | 9/1975 | Burton et al. | 180/287 |
| 4,023,138 | 5/1977 | Ballin | 180/287 |
| 4,672,375 | 6/1987 | Mochida et al. | 180/287 |
| 4,740,775 | 4/1988 | Price | 180/287 |
| 4,761,645 | 8/1988 | Mochida | 340/825.72 |
| 4,791,409 | 12/1988 | Reid | 340/825.72 |
| 4,811,013 | 3/1989 | Akutsu | 180/287 |
| 4,897,644 | 1/1990 | Hirano | 307/10.2 |

Primary Examiner—Glen R. Swann, III
Attorney, Agent, or Firm—Bailey & Hardaway

[57] ABSTRACT

A security system for electrical appliances and other items with electrical circuitry includes a signal source operating within a predetermined zone. A receiver within the appliance or other item receives the signal and activates a circuit thereby permitting operability of the appliance or other item when the signal is received. The appliance or other item is disabled upon removal from the zone.

1 Claim, 2 Drawing Sheets

SECURITY SYSTEM FOR ELECTRICAL APPLIANCES AND OTHER ITEMS WITH ELECTRICAL CIRCUITRY

This application is a continuation of application Ser. No. 07/240,547, filed Sept. 6, 1988, abandoned, which is a continuation-in-part of Reid, U.S. application Ser. No. 07/037,701, filed Apr. 13, 1987 now U.S. Pat. No. 4,791,409 issued Dec. 13, 1988.

BACKGROUND OF THE INVENTION

This invention relates generally to a security system for the deterrence of theft of electrical appliances or other property with electrical circuitry and more particularly to a security system which deters by limiting the operability of electrical appliances or other items with electrical circuitry to the perimeters of a specified zone.

Various security systems exist within the prior art for the prevention of theft of property. One such system is disclosed in Bernhardt U.S. Pat. No. 4,559,529 in which radio signals are transmitted to protect monitored articles. An audible alarm is triggered if an improper code is received. Whalen, et al. U.S. Pat. No. 3,710,371 disclose a system which employs a mercury switch to energize an alarm, and the systems disclosed in Lent U.S. Pat. No. 4,284,983 and Matto, et al. U.S. Pat. No. 3,836,901 sound alarms if there is unauthorized disconnection of the monitored appliance and the appliance is moved from its original position. In addition, security systems disclosed in Manley, et al. U.S. Pat. No. 3,794,989 and Cline U.S. Pat. No. 3,484,775 trigger alarms when a monitored appliance is disconnected, and Boyd, et al. U.S. Pat. No. 4,573,042 and Antenore U.S. Pat. No. 4,136,338 disclose systems which sound alarms when physical parameters have been exceeded by a monitored appliance.

While the prior art provides various security systems for designated articles, there exists a need for a theft prevention system for electrical items with an effective deterrent alternative.

SUMMARY OF THE INVENTION

It is thus an object of this invention to provide a novel security system for electrical appliances or other items with electrical circuitry whereby a monitored item's operability is dependent upon its presence within the parameters of a specified zone of operation.

It is a further object of this invention to provide an inexpensive security system which does not require professional assistance to install.

These as well as other objects are accomplished by a security system for electrical appliances and other items with electrical circuitry comprising a signal source emitting a coded signal, frequency or pulse within a specified zone, a receiver for such signal attached to the electrical circuitry of the monitored device and a circuit activated by the receiver which renders the device operable inside the zone, that circuit being broken when the device is removed from the zone, thus rendering the device inoperable.

BRIEF DESCRIPTION OF THE DRAWINGS

FIG. 3' schematically illustrates the apparatus of this invention with the activation switch in the closed position.

DETAILED DESCRIPTION

In accordance with this invention, it has been found that a security system for electrical appliances and other items with electrical circuitry to be herein described may be employed to deter the unauthorized removal of a monitored item from its intended place of operation. The security system of this invention is comprised of two principal parts, a signal source and a signal detector. The signal source, which may be either stationary or portable, emits a signal in all directions within the parameters of a specified zone. The receiver or signal detector is attached to the electrical circuitry of the monitored items. When the detector receives the properly coded emissions from the source, a circuit is activated, thus the monitored item remains operable. Outside the specified zone, however, the emitted signals are not received by the detector, the circuit is broken, thus rendering the device inoperable. Thus, an article monitored by the system of this invention would be of no value to one unauthorized to remove it from its zone of operation. Other advantages and features will be apparent from the following description and reference to the various figures of drawing.

Figure 1:
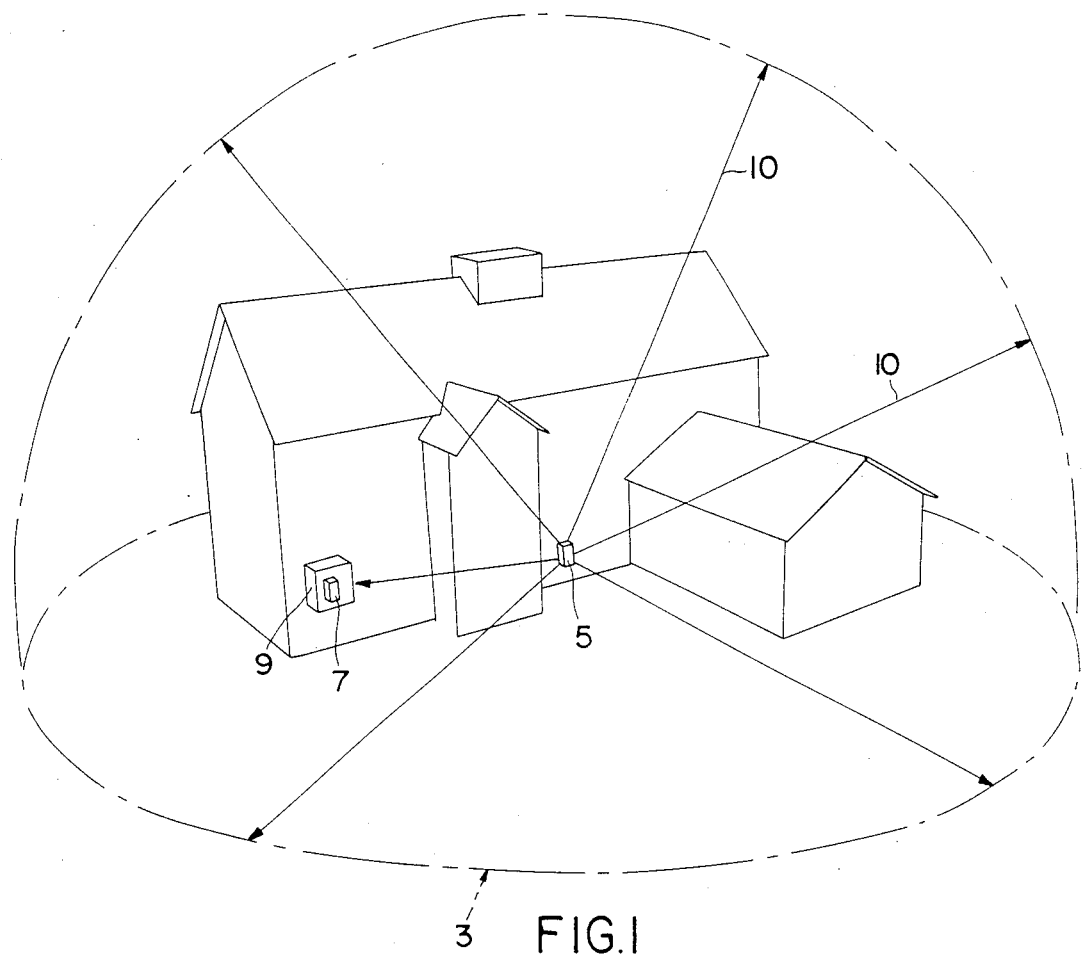
FIG. 1 of the drawings illustrates the relative positions within a specified zone of a stationary signal source and a signal detector attached to a monitored article in accordance with this invention.

FIG. 1 of the drawings illustrates, in accordance with this invention, the relative positions within a specified zone 3 of a stationary signal source 5 and a signal detection device 7 attached to the electrical circuitry of a monitored article 9. The physical and electrical properties of the detector 7 conform with the physical and electrical properties of article 9 a the time of installation. The signal source 5 is placed in an obscure location within the subscriber's house such that monitored household articles, as for example, article 9, are positioned within the parameters of the associated zone 3. Sonic, infrared radio, magnetic or microwave emissions 10, coded in ways well known in the art, continually radiate from the power source 5 and are received by one or more detectors 7 positioned in one or more monitored articles 9.

Article 9 remains operable in the presence of the coded emissions 10 since the detector is receiving the frequency it is programmed to receive. As article 9 is removed from the specified zone 3, the receiver 7 no longer receives the required signal and a switching mechanism within the detector 7 is activated, breaking a circuit of the monitored article 9 in ways known in the art. Thus, article 9 is rendered inoperable. For switching apparatus responsive to electromagnetic or sonic sources, the teachings of the following U.S. Patents are hereby incorporated by reference: Salners U.S. Pat. No. 3,189,000; Smith U.S. Pat. No. 3,165,090; Rieth U.S. Pat. No. 3,157,152; Cotsworth U.S. Pat. No. 3,133,269; and Baldwin U.S. Pat. No. 2,902,604.

Figure 2:
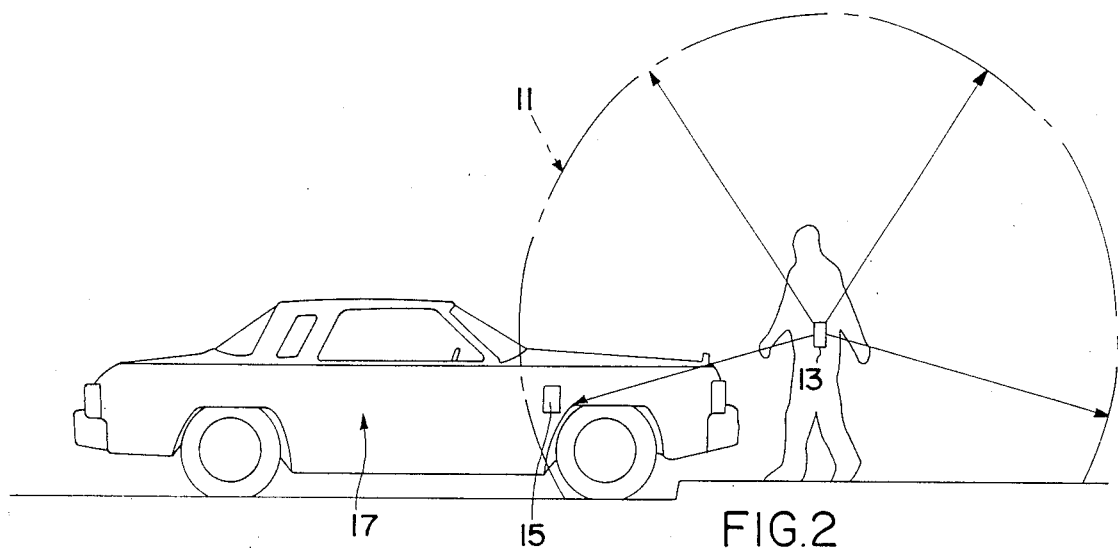
FIG. 2 of the drawings illustrates the relative positions vis-a-vis a specified zone of a portable signal source and a signal detector attached to a monitored article in accordance with this invention.

FIG. 2 of the drawings illustrates in accordance with this invention the relative positions vis-a-vis a specified zone 11 of a portable signal source 13 and a signal receiver 15 attached to a monitored vehicle 17. A portable signal source 13 is required in monitoring vehicles such as cars, boats, motorcycles or airplanes since, during the time of normal operation, these items are mobile and would exceed the prescribed zone associated with a stationary energy source. The portable signal source 13 allows proper operation of the monitored device when it is worn or carried by the operator of the device. Unlike specified zone 3, discussed above, specified zone 11 moves with the portable signal source 13. Thus, when the authorized operator carries the portable source outside of a certain range of the vehicle which renders the receiver outside of the zone 11, the vehicle becomes inoperable. When the user brings the portable source 13 into that range of the vehicle, the receiver is then within zone 11 and the vehicle becomes operable. Additionally, it should be noted that such a portable signal system is adaptable to any portable item which, like a vehicle, commonly moves great distances, such as cameras, portable TV's and radios, etc. The circuitry design of the present system is especially advantageous for use in vehicles.

Figure 3:
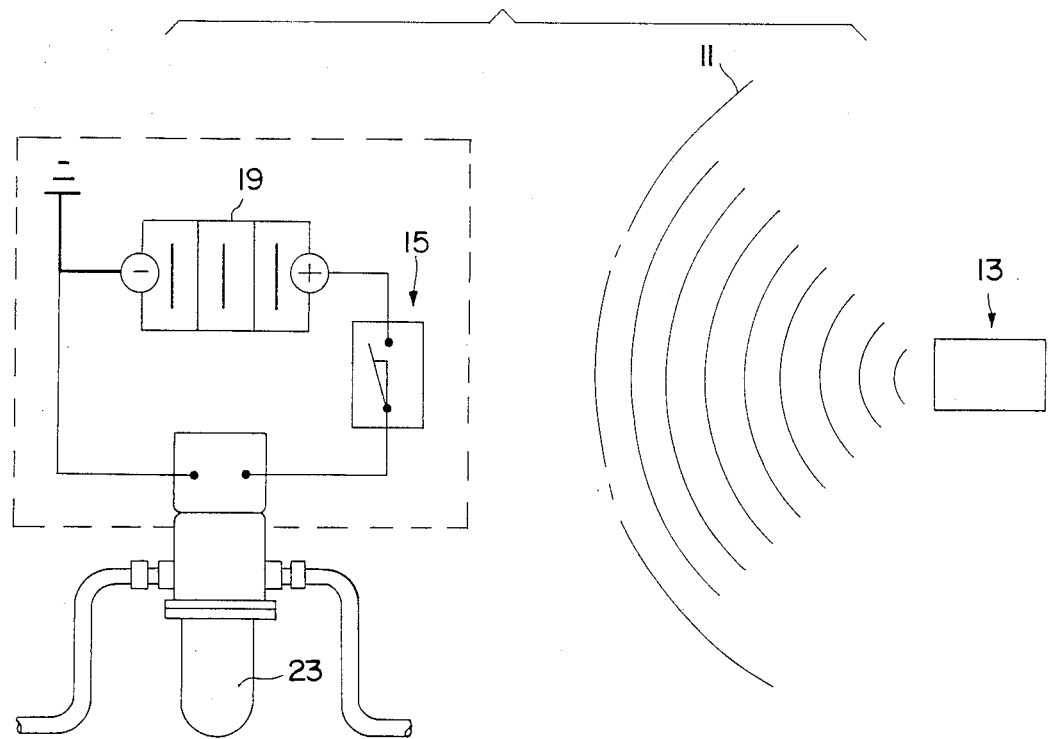
FIG. 3 schematically illustrates the apparatus of this invention with the activation switch in the normally-open position.
Figure 3:
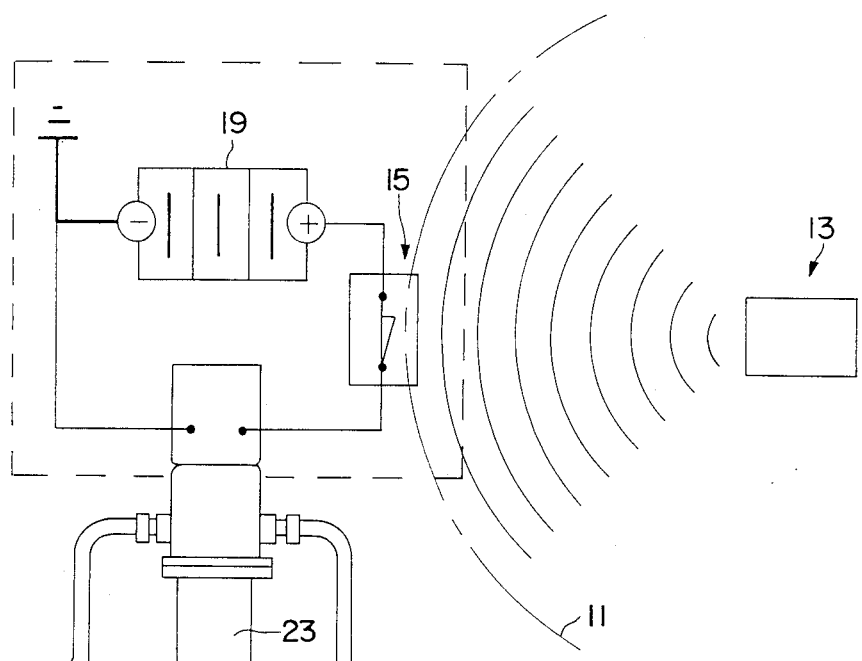

FIGS. 3 and 3' are diagrammatic illustrations of the detector 15 in association with signal source 13. The circuit of the system is normally open and is associated with some critical electrical component of the vehicle such as for example the electrical fuel pump illustrated in FIGS. 3 and 3'. However, as it is best illustrated in FIG. 3', when the portable source 13 is brought within the specified range of the vehicle, the receiver 15 is within the zone 11 thereby closing the circuit and allowing for the operability of the fuel pump 23. Thus, when detector 15 receives the properly coded emissions from source 13, a circuit is activated. From the outside of zone 11, however, the emitted signals are not received by detector 15, the circuit is broken, thus rendering the vehicle inoperable. This system has an obvious advantage for use in vehicles in that when the user is away from the vehicle, the circuit is opened rather than closed and is, therefore, not putting a drain on the battery 19. This represents an improvement over the prior art of Ballin in U.S. Pat. No. 4,023,138 which required that a circuit was closed when a transmitter exceeds a predetermined distance.

An additional embodiment of the security system in accordance with this invention allows the energizing of an alarm circuit by a switching mechanism as the monitored article exceeds the parameters of the prescribed zone. Thus, not only is the article rendered inoperable, but its removal from the subscriber's home is signaled by an audible alarm sounding for a predetermined length of time. In a vehicle, any attempt to start the vehicle when the portable signal source is outside of the required range will result in such an alarm. However, as the circuit is broken when the item is removed from the specified zone, the alarm within the item requires its own power source such as a battery pack or compressed gas. Although the installation of the security system does not require professional assistance, the expertise of a security agency would be required to reset the system if such an alarm were activated. The resetting would include replacement of the battery pack or compressed gas canister. By this action, the security of the protected articles would be further insured.

One important aspect of the security system in accordance with this invention herein described is an awareness program to advertise the system to potential subscribers and to educate persons unauthorized to remove a subscriber's property from its zone of operation about the operability of the system. The program includes supplying notices of the implemented system to a subscriber for use on house and/or grounds as well as on each protected article.

It is thus seen that the security system described herein is a novel and effective means of deterring unauthorized removal of electrical appliances or other items with electrical circuitry from their intended locations. Further, the instant invention is noteworthy in that it is not limited to one type of energy wave for its operation. As variations of the instant invention will be apparent to one of skill in the art from a reading of the above specifications, such variations are within the spirit and scope of this invention as defined by the following appended claims.

That which is claimed:

1. A security system for a portable device with electrical circuitry comprising:
   a portable signal source for emitting a coded signal over a predetermined range;
   a receiver for said emitted signal attached to said electrical circuitry of said portable device;
   normally open switch means comprising a circuit actuated by said receiver, said means being activated and closed thereby rendering said portable device operable, when said portable signal source is within said predetermined range; and
   a battery for operating said electrical circuitry; said switch means "when deactuated" preventing drain on said battery.

* * * * *